Aug. 31, 1926.    1,598,060
C. E. DAWSON ET AL
DITCHING MACHINE
Filed Oct. 2, 1925    2 Sheets-Sheet 2
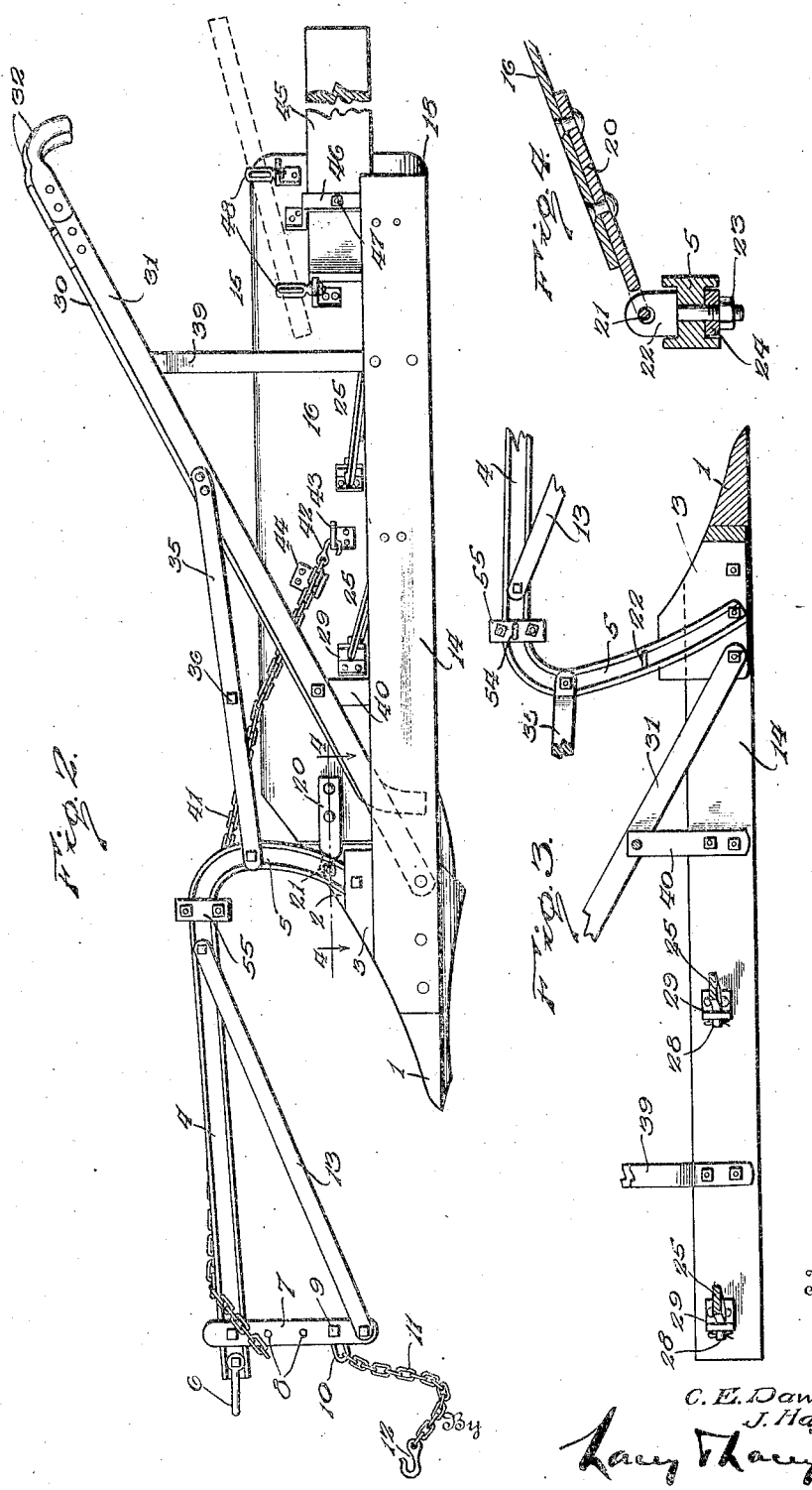
Inventor
C. E. Dawson
J. Hayden
Lacy Lacy, Attorneys Patented Aug. 31, 1926.

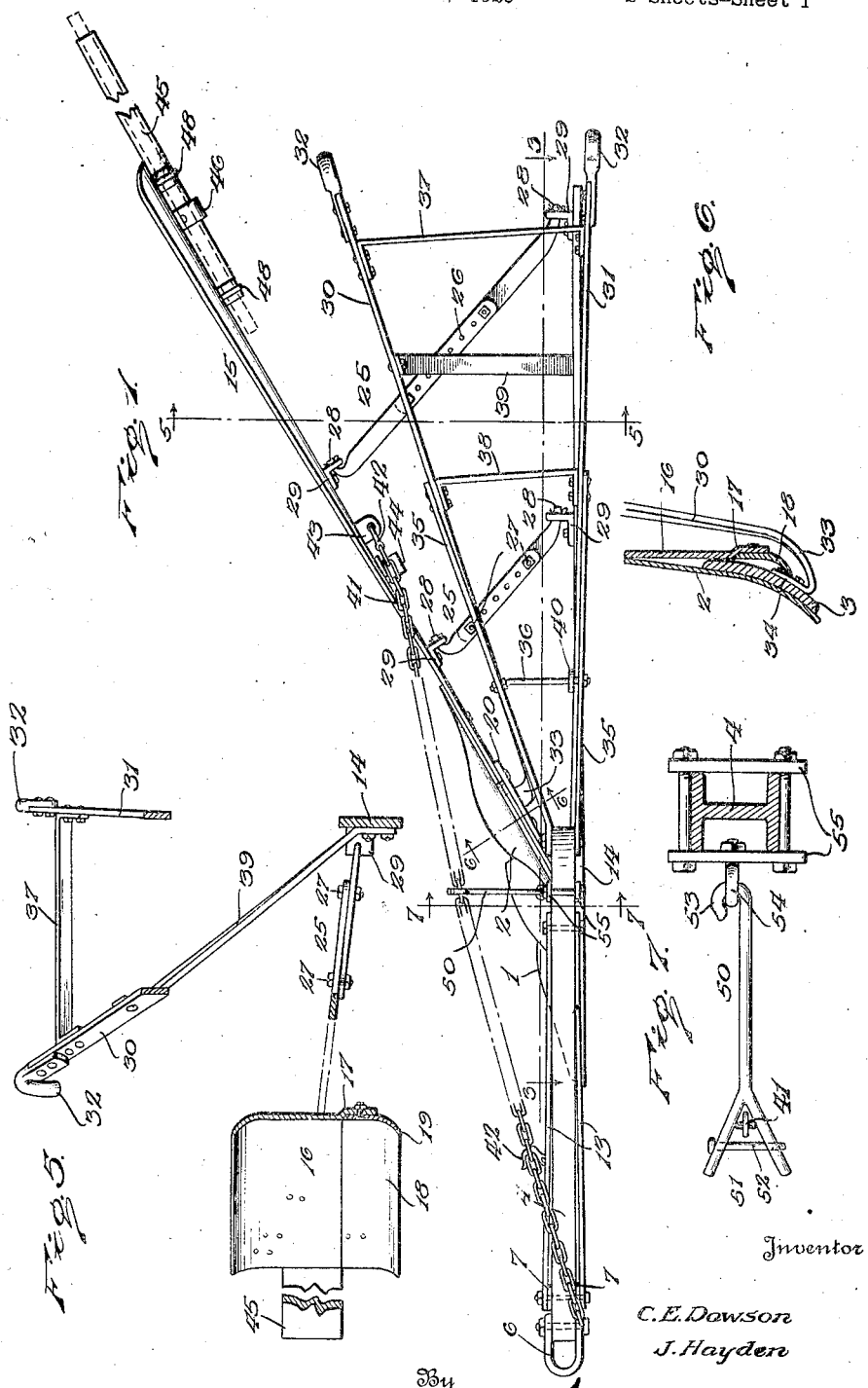

1,598,060

UNITED STATES PATENT OFFICE.

CHARLES E. DAWSON AND JEROME HAYDEN, OF OWENSBORO, KENTUCKY.

DITCHING MACHINE.

Application filed October 2, 1925. Serial No. 60,094.

Our invention relates to ditching machines and is designed more particularly for use in forming ditches to receive drain tiles but may be employed in the building and repairing of roads. One object of the invention is to provide a strong and durable machine which will operate efficiently and which may be readily drawn along the line of a proposed ditch or along a road to penetrate the ground and turn the loosened soil to one side. The invention also seeks to provide a machine which will be effectually held to its work and which may be readily adjusted to set the scraper at any desired angle to the cutting point or breaking plow. Another object of the invention is to so mount the scraper that it will automatically accommodate itself to the ditch as the depth of the latter decreases, and the invention also has for its object the provision of means whereby the machine may be easily moved over obstructions. Another object of the invention is to provide novel draft appliances whereby the machine may be permitted to accommodate itself to any obstruction which may be encountered when it is being drawn by a tractor. These several stated objects, and other objects which will incidentally appear in the course of the following description are attained in such an apparatus as is illustrated in the accompanying drawings, and the invention resides in certain novel features which will be particularly pointed out in the appended claims.

In the drawings:

Figure 1 is a plan view of our improved machine;

Fig. 2 is a side elevation thereof looking at the landside side;

Fig. 3 is a view, partly in elevation and partly in vertical section, showing the inner side of the landside;

Fig. 4 is an enlarged detail section on the line 4—4 of Fig. 2;

Fig. 5 is a transverse vertical section on the line 5—5 of Fig. 1;

Fig. 6 is an enlarged detail section on the line 6—6 of Fig. 1, and

Fig. 7 is an enlarged detail section on the line 7—7 of Fig. 1.

In carrying out our invention, we employ a standard breaking plow comprising a point 1 and moldboard 2 secured to a frog 3 of the usual construction. The breaking plow also includes a beam 4 having its rear end turned downwardly to provide an integral standard 5, the lower end of which is bolted to the frog 3 in the usual manner. At the front end of the beam 4 is secured a ring or bail 6 which may have pivotal movement and immediately in rear of said ring or bail the upper ends of vertical draft bars 7 are bolted to the beam, these bars having a plurality of openings 8 therethrough, through selective ones of which may be fitted a bolt 9 carrying a ring 10. The ring 10 forms one end of a draft chain 11 which is equipped at its other end with a hook 12 adapted to be engaged in whiffletrees or other draft devices when the machine is to be drawn by draft animals. When the machine is drawn by a tractor, the chain is passed upwardly through the ring or bail 6 and the hook 12 is engaged with the usual drawbar provided at the rear end of the tractor. The openings 8 through the bar 7 permit the chain to be set at the proper height for the draft under any given conditions, and when the machine is to be drawn by a tractor the passing of the chain through the ring or bail 6 disposes the chain at the proper height for operative connection with the tractor. The rear end of the tractor frame will be disposed in proximity to the front end of the beam 4 and when the tractor strikes an obstruction the momentary halting of the tractor will cause the rear end thereof to move relatively over the front end of the beam, the ring or bail 6 swinging into an approximately vertical position and the draft chain folding back over the beam and between the upper ends of the bars 7 so that it will be guided by said bars. Braces 13 extend between the lower ends of the draft bars 7 and the rear portion of the beam 4 and are securely bolted thereto so as to reinforce the draft bars and maintain them in the proper vertical position.

A landside 14 is secured to the frog 3 and projects rearwardly therefrom with its outer face flush with the corresponding surface of the point 1, as shown and as will be understood. Disposed in divergent relation to the landside is a scraper 15 which has its front end arranged in rear of the moldboard 2 and connected with the standard 5 so that it will be drawn along the ditch or over the road with the plow. This scraper comprises an upper plate 16 which is dished longitudinally so that it presents a somewhat concave face to the dirt which is being removed, the concavity gradually increasing toward the outer rear end of the scraper. The lower edge of the plate 16 is offset longitudinally, as shown at 17, and a blade 18 is seated in the said offset and securely bolted thereto, the lower edge of the blade being projected forwardly and sharpened, as shown at 19. This construction effects an economy in the use of the apparatus inasmuch as the wear is all upon the blade 18 which may be easily removed for sharpening when necessary and when it is worn out may be replaced without requiring the provision of an entirely new scraper. The front face of the blade 18, of course, is flush with the front face of the plate 16, and it may be noted at this point that all the bolts and rivets employed in the device have their heads countersunk in the parts through which they are inserted. To the rear side of the scraper plate 16 at the front end thereof is secured a bar 20 which projects forwardly beyond the plate and has its front end formed into a hook 21 adapted to be engaged in an eye-bolt 22 which is secured in the standard 5 by a nut 23 turned home against a washer 24 fitted in the channel of the standard, as shown most clearly in Fig. 4. The scraper will thus be connected with the standard so that it must move forwardly with the latter but it may move pivotally relative to the standard so that its rear end may naturally and automatically assume a relatively higher position than its front end as the depth of the ditch increases, the result being that a substantially V-shaped ditch will be dug in which drain tile may be laid. Of course, an open drain ditch may be produced in the like manner. The described connection between the scraper and the standard 5 also permits the scraper to move laterally with respect to the standard in a pivotal manner so that the scraper may be set closer to or farther from the landside and to maintain the scraper in the desired angular relation to the landside and the standard, we provide coupling bars 25 consisting of similar flat sections having their inner ends overlapping and provided with longitudinal series of openings 26 through which securing bolts 27 may be inserted to vary the effective length of the coupling bars and secure them in the adjusted relation. The outer ends of each section of the coupling bars terminate in tips 28 of circular cross section to be engaged through openings provided therefor in angle brackets 29 secured to the inner sides of the scraper and the landside respectively. Any convenient means, such as cotter pins, may be engaged with the extremities of the coupling bars so as to retain them in engagement with the angle brackets. The circular formation of the terminals 28 will permit the coupling bars to have pivotal movement in the brackets so that the described pivotal movement of the scraper will be accommodated but movement of the scraper laterally with respect to the landside will be effectually prevented and the scraper will, therefore, operate efficiently to turn aside the loosened dirt.

Handle bars 30 and 31 having grips 32 at their rear ends are provided, the front end of the handle bar 31 being bolted to the landside and the frog in the usual manner and the front end of the handle bar 30 being turned outwardly, as shown at 33, to clear the front end of the lower edge of the scraper and provide an upstanding toe 34 which fits against the rear side of the frog 3 and is bolted thereto, as shown in Fig. 6. Braces 35 extend between the handle bars and the standard 5 and are rigidly secured thereto so as to reinforce the structure, and these braces are connected between their ends by a coupling bolt 36 whereby additional rigidity is attained. Cross bars 37 and 38 extend between and are secured to the handle bars so as to rigidly maintain them in their proper spaced relation and a diagonal bracing bar 39 extends between the handle bar 30 and the landside and is rigidly secured thereto so as to provide a firm support for said handle bar. A vertically disposed bar 40 is secured to the landside and to the handle bar 31 so as to provide a support for the said handle bar, the handle bars being thus very rigidly braced and secured to the machine so that they will withstand the strains placed upon them and will permit the operator walking behind the apparatus to easily hold it to the desired path.

We also provide a chain 41 having hooks 42 at its ends, the said chain having its front end wrapped about the beam 4 and secured thereto by having the hook at said end engaged in a proper link of the chain and the hook at the rear end of the chain being engaged in an angle bracket 43 provided therefor upon the inner side of the scraper. The intermediate portion of the chain passes over the upper edge of the scraper and rests upon a bracket 44 secured upon the rear side of the scraper adjacent the bracket 43, as shown clearly in Figs. 1 and 2. This chain distributes the draft so that a part thereof will be exerted directly upon the scraper and by passing over the bracket 44 and the upper edge of the scraper the tendency of the chain to straighten under stress will hold the scraper to its work. In order to prevent displacement and loss of the chain, we provide the supporting arm 50 which projects laterally from the beam 4 and is constructed at its outer end with a fork 51 through which the chain passes and by which it is supported. A pin 52 is inserted through the ends of the fork and retains the chain therein. The inner end of the arm is formed into a hook 53 and engaged in an eye 54 on the side of the beam, said eye being preferably carried by one of a pair of clamping plates 55 secured on the beam in an obvious manner, as shown in Fig. 7.

In order that the loosened dirt may be thrown to a greater distance from the ditch, as when working upon a road, an extension deflector 45 is provided. This extension may be a stout wooden bar of proper dimensions having its forward end engaged through a stirrup or ring 46 secured upon the rear side of the scraper adjacent the outer rear end thereof and the deflector will, of course, be secured within the said stirrup as by a bolt 47. We also mount upon the rear side of the scraper adjacent the outer rear end thereof a plurality of rings or eyes 48 through which any convenient bar, indicated in dotted lines in Figs. 1 and 2, may be engaged when the machine strikes an obstruction so that it may be easily lifted over the obstruction. If desired, the bar may be retained in engagement with the rings or eyes 48 and pressure exerted thereon so as to hold the scraper more firmly to the ground in order that it may cut into the same and turn aside a relatively greater body of dirt. This arrangement will be advantageous when grading roads.

From the foregoing description, taken in connection with the accompanying drawings, it will be seen that we have provided a very strong and at the same time inexpensive device which will operate in a highly efficient manner to form ditches and turn aside the dirt moved therefrom. The provision of a breaking plow permits the ground to be more completely broken into and turned over than could be done with ordinary road scrapers while at the same time our improved machine will reduce the surface of the ground at the side of the ditch to a level condition as thoroughly as the ordinary road scraper does such work. The scraper and its connections may be readily attached to any standard breaking plow, the only change needed being the substitution of the long landside 14 carrying the brackets 29 for the landside ordinarily provided.

Having thus described the invention, we claim:

1. The combination with a breaking plow including a moldboard and a standard, of a scraper having its front end disposed in rear of the moldboard, a coupling bar secured rigidly to the front end of the scraper and projecting forwardly beyond the same, the front end of said coupling bar being formed into a hook, and an eye-bolt in the standard of the plow engaged by said hook whereby to permit both vertical and horizontal pivotal movement of the scraper.

2. The combination with a breaking plow, of a scraper connected therewith and extending outwardly and rearwardly therefrom, a landside connected with the plow and extending rearwardly therefrom, extensible connections between the landside and the scraper, a handle bar secured at one end to the plow and rising rearwardly therefrom, a second handle bar having its front end extending laterally outward and terminating in an upstanding toe secured to the plow below the scraper, bracing connections between the handle bars, bracing connections between the handle bars and the landside, and bracing connections between the handle bars and the plow.

3. The combination with a breaking plow including a beam, of a scraper connected with the plow and extending outwardly and rearwardly therefrom, angle brackets secured to the rear side of the scraper, and a chain having one end secured to the beam of the plow and its opposite end engaged with one of said brackets, the intermediate portion of the chain passing over the upper edge of the scraper and bearing upon another of said brackets.

4. The combination with a breaking plow including a beam, of a scraper coupled to the plow and extending outwardly and rearwardly therefrom, draft bars secured to the beam of the plow adjacent the front end thereof, braces extending between the lower ends of said bars and the beam, a drive chain having one end carried by said vertical draft bars and adjustable along the height thereof, and a ring pivotally attached to the front end of the plow beam and adapted to receive said chain.

5. The combination with a breaking plow including a beam, of a scraper connected with the plow and extending outwardly and rearwardly therefrom, angle brackets secured to the rear side of the scraper, a chain having one end secured to the beam of the plow and its opposite end engaged with one of said brackets, the intermediate portion of the chain passing over the upper edge of the scraper and bearing upon another of said brackets, and an arm extending laterally from the beam and having its outer end supporting the intermediate portion of the chain.

In testimony whereof we affix our signatures.

CHARLES E. DAWSON. [L. S.]
JEROME HAYDEN. [L. S.]